(12) United States Patent
Chen

(10) Patent No.: US 8,033,239 B2
(45) Date of Patent: Oct. 11, 2011

(54) MARK RETAINING STRUCTURE OF A MICRO-DIFFERENTIAL PRESSURE GAUGE

(76) Inventor: Li-Chen Chen, Bade (TW)

( * ) Notice: Subject to any disclaimer, the term of this patent is extended or adjusted under 35 U.S.C. 154(b) by 46 days.

(21) Appl. No.: 12/636,309

(22) Filed: Dec. 11, 2009

(65) Prior Publication Data

US 2011/0139062 A1    Jun. 16, 2011

(51) Int. Cl.
*G09F 9/00* (2006.01)
*G01D 13/22* (2006.01)
(52) U.S. Cl. ... 116/321; 116/307; 116/333; 116/DIG. 1; 116/DIG. 6
(58) Field of Classification Search ............... 116/209, 116/230, 240, 280, 300, 302, 304–309, 316, 116/319–323, 327, 328, 332, DIG. 1, DIG. 6, 116/DIG. 15; D10/102, 103, 121–132; 368/44; 177/159
See application file for complete search history.

(56) References Cited

U.S. PATENT DOCUMENTS

| | | | | |
|---|---|---|---|---|
| 2,707,931 | A | * | 5/1955 | Croshier et al. ............... 116/296 |
| 3,045,638 | A | * | 7/1962 | Davio ........................... 116/306 |
| 3,086,493 | A | * | 4/1963 | Bullard, III ................... 116/231 |
| 3,203,391 | A | * | 8/1965 | Corwin ......................... 116/308 |
| 5,088,257 | A | * | 2/1992 | Loga et al. ............... 52/204.591 |
| 5,607,078 | A | * | 3/1997 | Nordberg et al. ............. 220/756 |
| 5,765,501 | A | * | 6/1998 | Tung et al. .................... 116/323 |
| 6,415,672 | B1 | * | 7/2002 | Hamilton et al. ............ 73/866.3 |
| 6,718,907 | B2 | * | 4/2004 | Kao ............................... 116/300 |
| 7,509,848 | B2 | * | 3/2009 | Chen .............................. 73/146 |

* cited by examiner

*Primary Examiner* — Amy Cohen Johnson
(74) *Attorney, Agent, or Firm* — Chun Ming Chih

(57) ABSTRACT

A mark retaining structure of a micro-differential pressure gauge includes a mark member attached to the edge of the micro-differential pressure gauge for indicating the critical value. The mark member includes an engaging portion, an extension board and a hook to engage with a recess and a circular flange of the micro-differential pressure gauge. The present invention provides a positioning function.

4 Claims, 3 Drawing Sheets

MARK RETAINING STRUCTURE OF A MICRO-DIFFERENTIAL PRESSURE GAUGE

BACKGROUND OF THE INVENTION

1. Field of the Invention

The present invention relates to a mark retaining structure of a micro-differential pressure gauge, in particular to a mark attachment structure for a pointer gauge.

2. Description of the Prior Art

A conventional gauge, such as a micro-differential pressure gauge or a pressure gauge, includes a pointer therein. The pointer is rotated according to the pressure. In conjunction with a numeral scale plate in the gauge, the user can read the value. In general, the gauge is set with a security value. For the user to know whether or not the pointer is in the range of safety, the gauge is provided with a safety mark. The inventor of the present application has an idea that the retaining way should be simplified for a convenient operation and the positioning effect should be improved. Accordingly, the inventor of the present invention has devoted himself based on his many years of practical experiences to solve this problem.

SUMMARY OF THE INVENTION

The primary object of the present invention is to provide a mark retaining structure of a micro-differential pressure gauge, which has a secure mark structure that is not easy to be disengaged from the gauge so as to solve the shortcomings of the conventional gauge.

A further object of the present invention is to provide a positioning function after adjustment, so that the mark member can not be moved at random to result in a wrong reading.

In order to achieve the aforesaid objects, the present invention comprises a gauge and a mark member. The gauge has an edge provided with a side body and a recess formed in the side body. The side body has a circular flange thereon. The mark member includes an extension board at a distal end thereof, a hook which is formed by bending a rear end of the extension board, and an engaging portion disposed at a bottom of the mark member. The mark member is coupled on the edge of the gauge. The engaging portion is engaged with the recess. The extension board is fitted on the circular flange with the hook to engage with the circular flange. Accordingly, the present invention provides a secure engagement of the mark member and the gauge.

DETAILED DESCRIPTION OF THE PREFERRED EMBODIMENTS

Embodiments of the present invention will now be described, by way of example only, with reference to the accompanying drawings.

Figure 1:
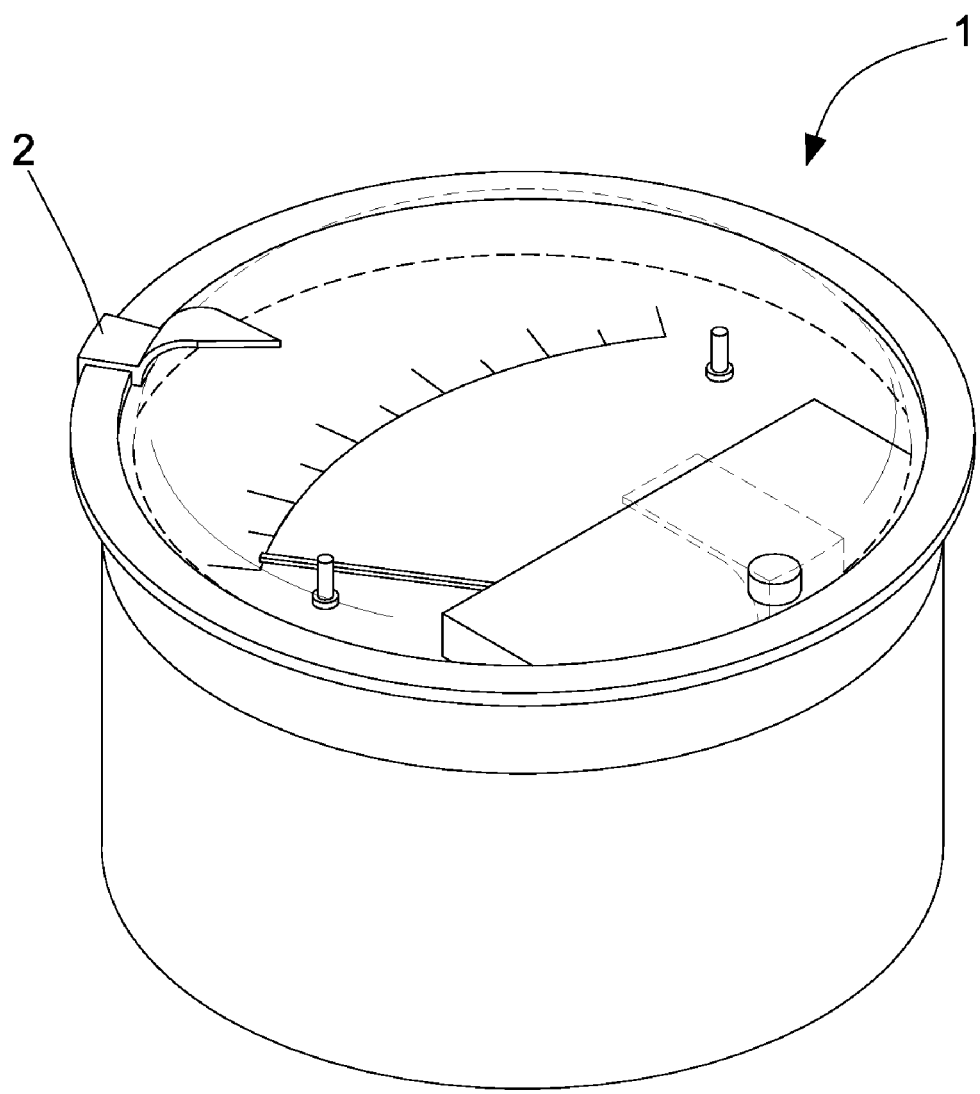
FIG. 1 is a perspective view according to a preferred embodiment of the present invention.
Figure 2:
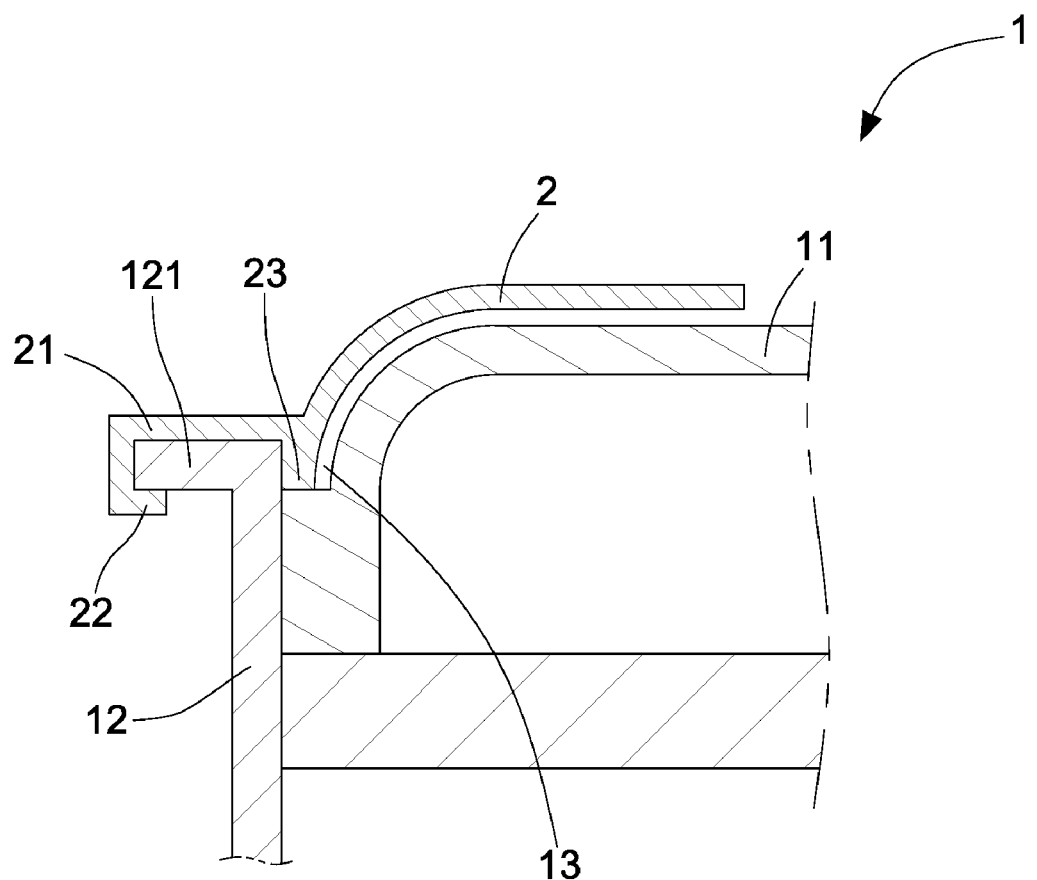
FIG. 2 is a cross-sectional view according to the preferred embodiment of the present invention.
Figure 3:
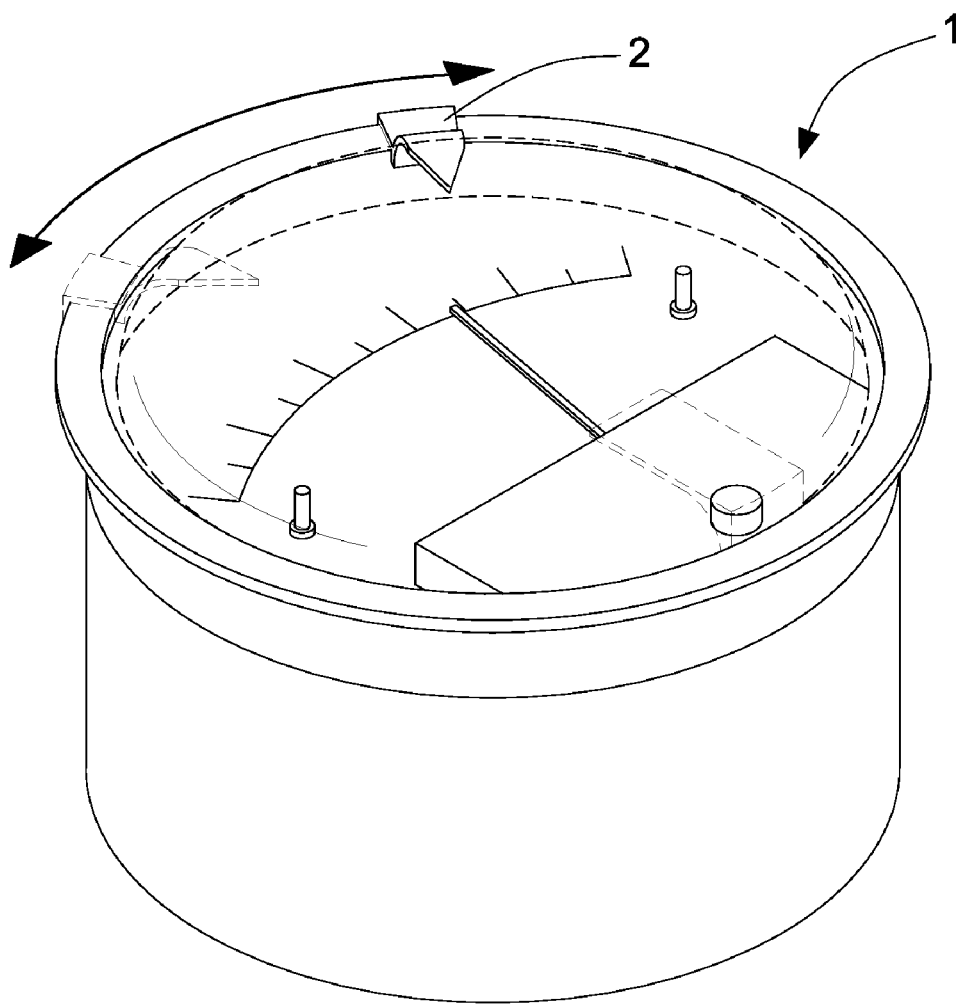
FIG. 3 is a perspective view according to the preferred embodiment of the present invention when in use.

As shown in FIG. 1 to FIG. 3, a mark retaining structure of a micro-differential pressure gauge according to a preferred embodiment of the present invention comprises a gauge 1 and a mark member 2.

The gauge 1 is a pointer gauge adapted for as a pressure gauge or a micro-differential pressure gauge. The gauge 1 includes a gauge surface which is a transparent window 11, a side body 12 connected to an edge of the window 11, and a recess 13 formed between the window 11 and the side body 12. The side body 12 has a circular flange 121 thereon.

The mark member 2 is shaped like a pointer and made of resilient material. The mark member 2 includes an extension board 21 at a distal end thereof, a hook 22 which is formed by bending a rear end of the extension board 21, and an engaging portion 23 disposed at a bottom of the mark member 2.

The mark member 2 is coupled on the gauge 1. The engaging portion 23 of the mark member 2 is engaged with the recess 13 of the gauge 1. The extension board 21 is fitted on the circular flange 121, with the hook 22 to engage with the circular flange 121. By the engaging portion 23, the extension board 21 and the hook 22 to cover the circular flange 121, the mark member 2 is firmly attached to the edge of the gauge 1. The mark member 2 is hardly to be moved or disengaged from the gauge 1 except that an external force is applied on the mark member 2 to be moved slowly along the edge of the gauge 1.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A mark retaining structure of a micro-differential pressure gauge, comprising:
   a gauge having an edge provided with a side body, a recess formed in the side body and a transparent cover fixed within the side body, the side body having a circular flange thereon; and
   a mark member including an extension board at a distal end thereof, a hook which is formed by bending a rear end of the extension board, and an engaging portion disposed at a bottom of the mark member, wherein a front end of the extension board forms a pointer which is disposed over the transparent cover;
   the mark member being coupled on the edge of the gauge, the engaging portion being engaged with the recess, the extension board being fitted on the circular flange with the hook to engage with the circular flange.

2. The mark retaining structure of a micro-differential pressure gauge as claimed in claim 1, wherein the gauge is a pointer gauge adapted for a pressure gauge or a micro-differential pressure gauge.

3. The mark retaining structure of a micro-differential pressure gauge as claimed in claim 1, wherein the mark member is made of a resilient material.

4. The mark retaining structure of a micro-differential pressure gauge as claimed in claim 3, wherein the recess is formed between the transparent cover and the side body.

* * * * *